H. Miller
Soldering Cans.
Nº 39616.  Fig. 1  Patented Aug. 18. 1863.
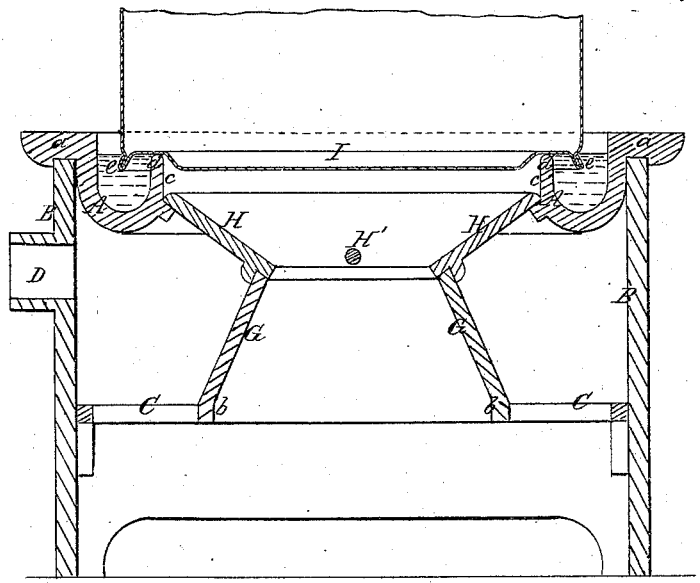
Fig. 2
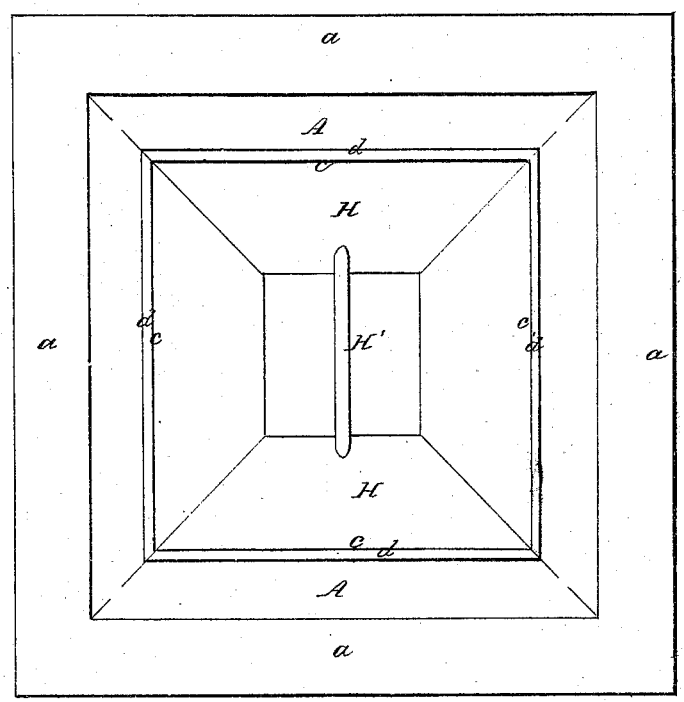
Witnesses.
Th. H. Douglas
Geo. W. Reed
Inventor.
Herman Miller

UNITED STATES PATENT OFFICE.

HERMAN MILLER, OF NEW YORK, N. Y., ASSIGNOR TO C. T. RAYNOLDS, F. W. DEVOE, AND CHAS. PRATT, OF SAME PLACE.

IMPROVEMENT IN SOLDERING SHEET-METAL CANS.

Specification forming part of Letters Patent No. 39,616, dated August 18, 1863.

*To all whom it may concern:*

Be it known that I, HERMAN MILLER, of the city, county, and State of New York, have invented a new and useful Improvement in the Soldering of Sheet-Metal Cans and other Vessels; and I do hereby declare that the following is a full, clear, and exact description of the same, reference being had to the accompanying drawings, forming part of this specification, in which—

Figure 1 is a vertical section of the apparatus employed in carrying out my invention. Fig. 2 is a plan of the same.

Similar letters of reference indicate corresponding parts in both figures.

The object of my invention is to effect the soldering of the joints of tin cans and other vessels of sheet metal by dipping the joint into the melted solder, by which means the soldering can be effected more expeditiously and with a smaller quantity of solder, and the use of a cheaper solder containing a larger proportion of lead which would not follow a soldering-iron is permitted; and to this end it consists in the employment, for containing the melted solder in which the joint is to be dipped, of a pan open in the center and of such form as to contain the solder in a channel of a form corresponding with that of the joint to be soldered, without allowing any other portions of the can or vessel but those in immediate proximity to the joint to come into contact with the melted solder. It also consists in constructing such pan with a resting-place for the can or vessel to be soldered to insure the dipping of all parts of the joint in the solder to a uniform depth. To enable this mode of soldering to be successfully performed, it is desirable, if not absolutely necessary, to adopt some construction of joint which projects from the adjacent portions of the can or vessel, and it was for this purpose that the double recessed clamping lap-joint which forms the subject of my Letters Patent dated June 23, 1863, was invented, which joint I consider better adapted to the purpose than any previously known.

To enable others skilled in the art to make and use my invention, I will proceed to describe it with reference to the drawings.

A is the solder-pan, represented as of square form, it being intended to solder at once the whole of the top or bottom joint of a square can. This pan is made with a flange, $a$, around its exterior margin to rest upon the sides of a furnace, B, of corresponding form. This furnace is constructed with a fire-grate, C, and chimney D, and there is an opening, $b\ b$, in the center of the said grate corresponding in form with the opening $c\ c$ left within the solder-pan A, the said opening being surrounded with a tube, G H, which serves to admit air under the can or vessel I, Fig. 1, which is to be soldered, for the purpose of preventing the formation below the bottom of the said vessel of a vacuum, which would prevent it from being easily lifted out of the solder-pan. This tube G H is made in two pieces, of which the lower piece, G, is secured to the grate C, and the upper piece, H, is provided with a suitable handle, H', and made movable to enable fuel to be introduced into the furnace around the piece G. The inner margin, $d$, of the solder-pan A is made to stand up sufficiently high to form a resting-place for the bottom or other part of the can or vessel I, and allow its joint $e$ to dip to a suitable depth into the solder-pan, and to keep the said joint out of contact with the bottom of the said pan in which the solder is always kept supplied to a suitable height to enable the joint to dip into it to a suitable depth when the can or other vessel is resting upon the said margin $e$. The bottom of the solder-pan is exposed to the direct heat of the fire in the furnace.

The process of soldering is extremely simple, as all that is required is to place the joint into the solder-pan with the adjacent portion or portions of the can or other vessel resting upon the margin $e$, and to allow it to remain for a few seconds of time, which will be sufficient to allow the solder to penetrate into the joint.

The form of the trough or solder-pan should correspond with the form of the joint to be soldered—as, for instance, for soldering on the tops and bottoms of circular vessels the said pan should be of annular form.

I do not here intend to claim any part of the construction of the furnace; but

What I claim as my invention, and desire to secure by Letters Patent, is—

1. The employment, for containing the melted solder in which the joint of any vessel is to be soldered by dipping, of a solder-pan open in the center, and containing the solder in a channel of a form corresponding with that of the joint to be soldered, substantially as and for the purpose herein described.

2. The construction of the solder-pan with a resting-place, $d$, or its equivalent, for the can or vessel to be soldered to regulate the depth to which the joint will enter the said pan, substantially as herein described.

HERMAN MILLER.

Witnesses:
 THOS. J. DOUGLAS,
 GEO. W. REED.